United States Patent
Thompson et al.

(10) Patent No.: US 6,983,776 B2
(45) Date of Patent: Jan. 10, 2006

(54) STRUCTURALLY SUPPORTED RESILIENT TIRE WITH BIAS PLY CARCASS

(75) Inventors: Ronald Hobart Thompson, Greenville, SC (US); Timothy B. Rhyne, Greenville, SC (US); Kenneth W. Demino, Anderson, SC (US); Steven M. Cron, Simpsonville, SC (US)

(73) Assignee: Michelin Recherche et Technique S.A., (CH)

( * ) Notice: Subject to any disclaimer, the term of this patent is extended or adjusted under 35 U.S.C. 154(b) by 489 days.

(21) Appl. No.: 10/319,772

(22) Filed: Dec. 13, 2002

(65) Prior Publication Data

US 2003/0121581 A1 Jul. 3, 2003

Related U.S. Application Data

(63) Continuation-in-part of application No. 10/081,571, filed on Feb. 22, 2002, now Pat. No. 6,769,465, which is a continuation of application No. PCT/US01/12481, filed on Apr. 16, 2001, which is a continuation-in-part of application No. PCT/US99/29366, filed on Dec. 10, 1999, which is a continuation of application No. PCT/US99/29366, filed on Dec. 10, 1999.

(51) Int. Cl.
*B60C 7/00* (2006.01)
*B60C 9/06* (2006.01)
*B60C 9/18* (2006.01)
*B60C 13/00* (2006.01)

(52) U.S. Cl. .................. 152/197; 152/246; 152/327
(58) Field of Classification Search ............ 152/246, 152/300–303, 323, 325, 327–329, 197, 516
See application file for complete search history.

(56) References Cited

U.S. PATENT DOCUMENTS

| 1,440,974 A | 1/1923 | Dornburgh |
| 2,650,633 A | 9/1953 | Eger |
| 3,233,649 A | 2/1966 | Jolivet et al. |
| 4,111,249 A | 9/1978 | Markow |
| 4,170,254 A | 10/1979 | Jackson |
| 4,241,775 A | 12/1980 | Jackson |

(Continued)

FOREIGN PATENT DOCUMENTS

DE  DT 25 18 223 A1  11/1976

(Continued)

OTHER PUBLICATIONS

Clark, Samuel, Ed., Mechanics of Pneumatic Tires, Nov., 1971. Sec. 5.4 (pp. 471-477).

*Primary Examiner*—Adrienne C. Johnstone
(74) *Attorney, Agent, or Firm*—E. Martin Remick; Adam Arnold

(57) ABSTRACT

A resilient tire that supports a load without internal air pressure includes a ground contacting tread portion and sidewall portions extending radially inward from said tread portion and anchored in bead portions. A bias ply carcass extends between the beads to support the sidewalls. A reinforced annular band is disposed radially inward of the tread portion. The band comprises an elastomeric shear layer at a radially outer side of the bias ply carcass and a membrane adhered to a radially outward side of the elastomeric shear layer. Each of the bias ply and membrane has a longitudinal tensile modulus sufficiently greater than the shear modulus of the shear layer so that when under load the ground contacting portion of the tire deforms to a flat contact region through shear strain in the shear layer while maintaining constant the length of the membranes.

19 Claims, 12 Drawing Sheets

U.S. PATENT DOCUMENTS

| | | |
|---|---|---|
| 4,425,953 A | 1/1984 | Rohde et al. |
| 4,456,048 A | 6/1984 | Markow et al. |
| 4,580,610 A | 4/1986 | Jackson |
| 4,671,333 A | 6/1987 | Rohde et al. |
| 4,934,428 A | 6/1990 | Aoki et al. |
| 5,164,028 A | 11/1992 | Uemura |
| 5,201,971 A | 4/1993 | Gifford |
| 6,167,931 B1 | 1/2001 | Hsiao |
| 6,640,859 B1 | 11/2003 | Laurent et al. |
| 6,701,987 B1 * | 3/2004 | Abbott ................ 152/516 |
| 6,769,465 B2 * | 8/2004 | Rhyne et al. ............... 152/197 |

FOREIGN PATENT DOCUMENTS

| | | |
|---|---|---|
| DE | 3 640 222 A1 | 6/1987 |
| EP | 0 844 110 A2 | 5/1998 |
| EP | 0 853009 A2 | 7/1998 |
| FR | 2 425 334 | 12/1979 |
| GB | 2 002 699 A | 2/1979 |
| WO | WO-00/61390 A1 * | 10/2000 |
| WO | WO-01/42033 A1 * | 6/2001 |

* cited by examiner

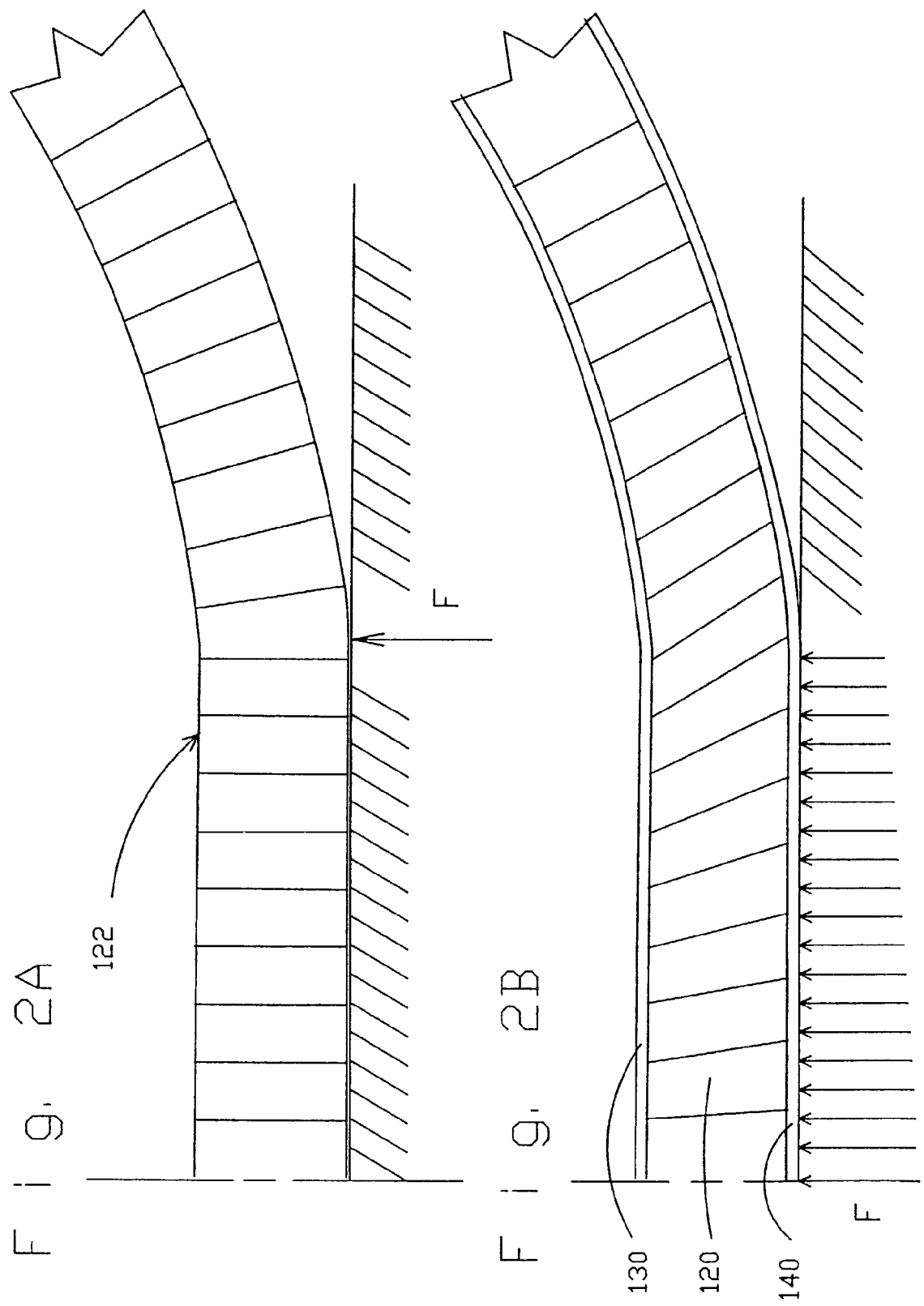

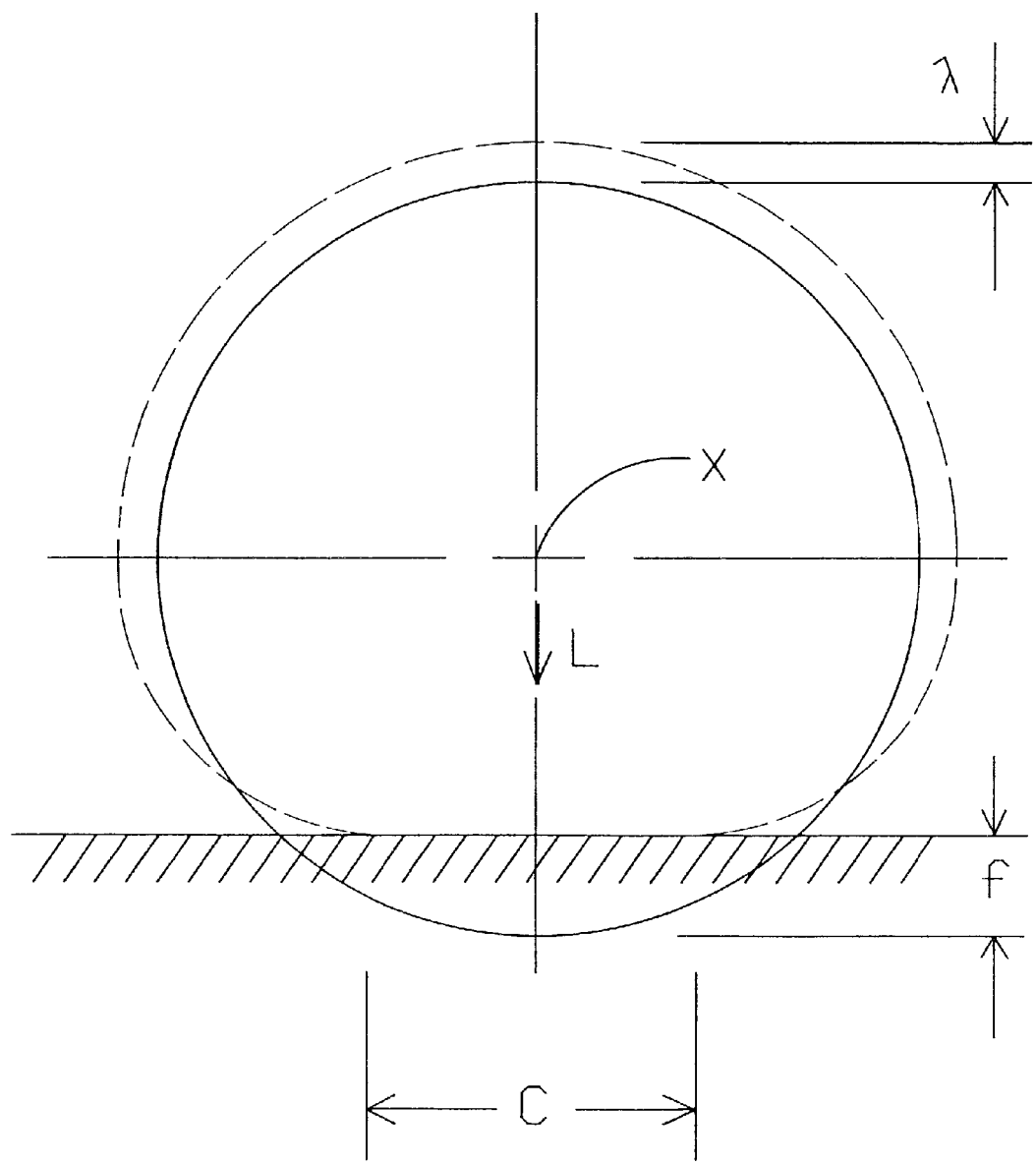

STRUCTURALLY SUPPORTED RESILIENT TIRE WITH BIAS PLY CARCASS

CROSS-REFERENCE TO RELATED APPLICATIONS

This application is a continuation-in-part of U.S. application Ser. No. 10/081,571 filed Feb. 22, 2002, now U.S. Pat. No. 6,769,465, issued Aug. 3, 2004, which is a continuation of international application PCT/US99/29366 filed Dec. 10, 1999. This application is also a continuation of international application PCT/US01/12481 filed Apr. 16, 2001, which is a continuation-in-part of international application PCT/US99/29366 filed Dec. 10, 1999.

BACKGROUND OF THE INVENTION

The invention relates to a resilient tire capable of supporting a vehicle load without the benefit of internal air pressure.

The pneumatic tire has been the solution of choice for vehicular mobility for over a century. The pneumatic tire obtains its mechanical attributes largely from the action of internal air pressure in the tire cavity, which provides correct rigidities to the belt and carcass components.

A difficulty with pneumatic tires is that good pressure maintenance is required to ensure adequate performance. When inflation pressure is lost entirely, a conventional pneumatic tire is capable of very limited, if any, use. Many tire constructions have been proposed to allow continued mobility of a vehicle after a complete loss of air pressure from the tire. One solution, the commercially available runflat tire, is a pneumatic tire having added sidewall reinforcements or fillers to permit the sidewalls to act in compression as load supporting members during limited deflated operation. This added reinforcement often results in the disadvantages of higher tire mass and reduced riding comfort. Other attempts to provide runflat capability utilize essentially annular reinforcing bands in the tire crown portion. In these solutions, the rigidity of the tread portion results partly from the inherent properties of the annular reinforcing band and partly from the reaction to inflation pressure. Still other solutions rely on secondary internal support structures attached to the wheel. These supports add mass to the mounted assembly and increase mounting difficulty or may require the use of multiple piece rims. All of these approaches are hybrids of an otherwise pneumatic tire structure and suffer from design compromises that are optimal for neither the inflated or deflated states.

In addition, these runflat solutions require the use of some means to monitor tire inflation pressure and to inform the vehicle operator if the inflation pressure is outside the recommended limits.

A tire designed to operate without the benefit of inflation pressure eliminates many of the problems and compromises associated with a pneumatic tire. There is only one operating condition, non-inflated. Neither pressure maintenance nor pressure monitoring is required. Structurally supported resilient tires such as solid tires or other elastomeric structures to date have not provided the levels of performance available in a conventional pneumatic tire. A structurally supported resilient tire solution that delivers pneumatic tire-like performance would be a welcome improvement.

SUMMARY OF THE INVENTION

A structurally supported resilient tire in accordance with the invention supports its load solely through the structural elements of tread, sidewall and bead portions without support from internal air pressure.

The tread portion of a structurally supported resilient tire, when viewed without the sidewall and bead portions, appears as a reinforced annular band. The reinforced annular band has rigidities to resist bending in both the tire meridian and equatorial planes. A meridian plane passes through the tire with the axis of rotation lying wholly in the meridian plane. The equatorial plane passes perpendicular to the tire axis of rotation and bisects the tire structure.

The contact of an annular band with a flat plane is analogous to a tire contacting a ground surface. The resultant reactions are analogous to the ground contact stresses of a loaded tire. For a stiff annular band comprised of a homogeneous material in contact with a flat plane, the pressure distribution satisfying the equilibrium and bending moment requirements is made up of a pair of concentrated forces located at each end of the contact area, one end of which is shown in FIG. 2A. In this idealization, no shear deformation of the annular band occurs in the contact region. However, if the annular band comprises a structure which prescribes shear deformation, the resulting pressure distribution is substantially uniform, as illustrated in FIG. 2B.

A structurally supported resilient tire in accordance with the invention includes a tread portion, sidewall portions extending radially from the tread portion toward a tire axis, and bead portions at radially inner ends of the sidewall portions to anchor the tire to a wheel. The tread, sidewalls, and beads form a toroidal shell that defines a hollow, annular interior space, similar to that in a pneumatic tire. According to the invention, an annular band is disposed radially inward of the tread portion. The annular band comprises an elastomeric shear layer, at least a first or inner membrane adhered to the radially inward extent of said elastomeric shear layer, and at least a second or outer membrane adhered to the radially outward extent of the elastomeric shear layer. Preferably, the membranes comprise superposed layers of essentially inextensible cord reinforcements embedded in an elastomeric coating layer. The membranes have a longitudinal tensile modulus of elasticity sufficiently greater than the shear modulus of elasticity of the elastomeric shear layer such that, under an externally applied load, the ground contacting tread portion deforms from essentially a circular shape to a flat shape while maintaining an essentially constant length of the membranes. Relative displacement of the membranes occurs by shear in the shear layer.

This effect is schematically represented in FIG. 2B. As shown in FIG. 2B, a beneficial result is a more uniform ground contact pressure throughout the length of the contact area compared to other tires not using an annular band having the deformation properties just described. The annular band does not rely on internal inflation pressure to have a transverse stiffness in a tire meridian plane and a longitudinal bending stiffness in the tire equatorial plane sufficiently high to act as a load-supporting member.

In one embodiment of the invention, the carcass comprises radially directed reinforcing cords embedded in a rubber or other elastomeric material, and the annular band includes a shear layer with discrete inner and outer membranes.

According to an alternative embodiment, the carcass comprises non-radially directed reinforcing cords embedded in a rubber or other elastomeric material, a so-called cross bias ply.

According to a further embodiment, the tire includes a cross bias ply carcass and a portion of the carcass radially adjacent to the shear layer is the inner membrane. The radially outer side of the carcass in the tire crown is adhered to the shear layer, and the carcass, at least in this area, has the longitudinal stiffness properties described above. An outer membrane of essentially inextensible reinforcing cords embedded in an elastomeric material is adhered to a radially outer surface of the shear layer.

According to one aspect of the invention, a transverse radius of the annular band, that is, the radius of curvature in the tire meridian plane, is less than the transverse radius of the outer tread surface. Buckling of the annular band in the contact area is resisted by this structure.

The structure according to the invention advantageously allows the tire designer to adjust the vertical stiffness of the tire somewhat independently of the contact pressure. In conventional pneumatic tires, by contrast, the vertical stiffness and ground contact pressure are strongly coupled.

The tire sidewalls provide the necessary structure to react at the wheel the load supported by the annular band, thus supporting the mass of a vehicle. In a conventional pneumatic tire, load support is provided by differences in tensions of the tire sidewalls, with the minimum sidewall tension being at the center of the contact area and the maximum being at a meridian opposite the contact area. As shown in FIG. 3A, the structurally supported resilient tire of the present invention substantially supports its load by tensioning the portion of the sidewall outside the contact area. Optimal load support is obtained when the sidewalls have a high effective radial stiffness in tension and a low effective radial stiffness in compression. When these conditions are satisfied, the wheel can be said to hang from the upper portion of the tire. In addition, for optimal load support, the sidewalls have a rectilinear profile in the meridian plane, that is, no curvature as in pneumatic tires.

The vertical stiffness of the tire of the invention, which is the resistance under load to deformation in the vertical direction, can be affected to a significant degree by the counterdeflection stiffness of the tire. Counterdeflection stiffness is a measure of the resistance of the tire to radial deformation of the portion not in ground contact. Counterdeflection of the tire allows some vertical displacement of the wheel axis, which effectively decreases the vertical stiffness of the tire. Adjusting the counterdeflection stiffness of the tire adjusts the vertical stiffness of the tire.

Vertical stiffness is also affected by rotation of the tire. When the tire of the invention rotates at high angular velocity, centripetal forces develop in the annular band. These forces result in circumferential stress, which tends to cause the annular band to expand radially outward. Expansion of the annular band is resisted by the high effective radial stiffness of the sidewalls. Since no such centripetal forces develop in the ground contact area, the net result is a vertically upward force, which acts to support a portion of the imposed load, and increases the effective vertical stiffness of the tire. The centripetal forces, and hence, the effective vertical stiffness of the tire, increase as speed increases; thus, the tire deflection is reduced as speed increases. Reduced deflection reduces heat generation in the tire and improves high-speed performance.

According to one embodiment of the invention, a structurally supported resilient tire comprises a radial ply carcass supporting a ground contacting tread portion, sidewall portions extending radially inward from the tread portion and anchored in bead portions adapted to remain secure to a wheel during rolling of the tire, and a reinforced annular band disposed radially inward of the tread portion, the band comprising an elastomeric shear layer, at least a first membrane adhered to the radially inward extent of the elastomeric shear layer and at least a second membrane adhered to the radially outward extent of the elastomeric shear layer.

According to another embodiment, a structurally supported resilient tire comprises a cross bias carcass supporting a ground contacting tread portion, sidewall portions extending radially inward from the tread portion and anchored in bead portions adapted to remain secure to a wheel during rolling of the tire, and a reinforced annular band disposed radially inward of the tread portion, the band comprising an elastomeric shear layer at least one outer membrane adhered to the radially outward extent of the elastomeric shear layer, and wherein a crown or summit portion of the cross bias carcass is adhered to the radially inward extent of the elastomeric shear layer and functions as an inner membrane.

BRIEF DESCRIPTION OF THE DRAWINGS

The invention will be better understood through reference to the following description and the appended drawings, in which:

FIG. 2A is a schematic diagram illustrating the ground reaction forces for a reference homogeneous band;

FIG. 2B is a schematic diagram illustrating the ground reaction forces for an annular band of the invention;

FIG. 4A illustrates counterdeflection stiffness in the tire equatorial plane;

DETAILED DESCRIPTION OF THE INVENTION

The following terms are defined as follows for this description:

"Equatorial Plane" means a plane perpendicular to the axis of rotation of the tire and bisecting the tire structure.

"Meridian Plane" means a plane passing through the tire in which the axis of rotation of the tire lies.

"Modulus" of elastomeric materials means the tensile modulus of elasticity at 10% elongation measured per ASTM Standard Test Method D412.

"Modulus" of the membranes means the tensile modulus of elasticity at 1% elongation in the circumferential direction multiplied by the effective thickness of the membrane. This modulus can be calculated by Equation 1, below, for conventional tire steel belt materials. This modulus is noted with a prime (') designation.

"Shear Modulus" of elastomeric materials means the shear modulus of elasticity and is defined equivalent to one-third the tensile modulus of elasticity measured at 10% elongation.

"Hysteresis" means the dynamic loss tangent measured at 10% dynamic shear strain, 30 Hertz and 25° C.

Figure 1:
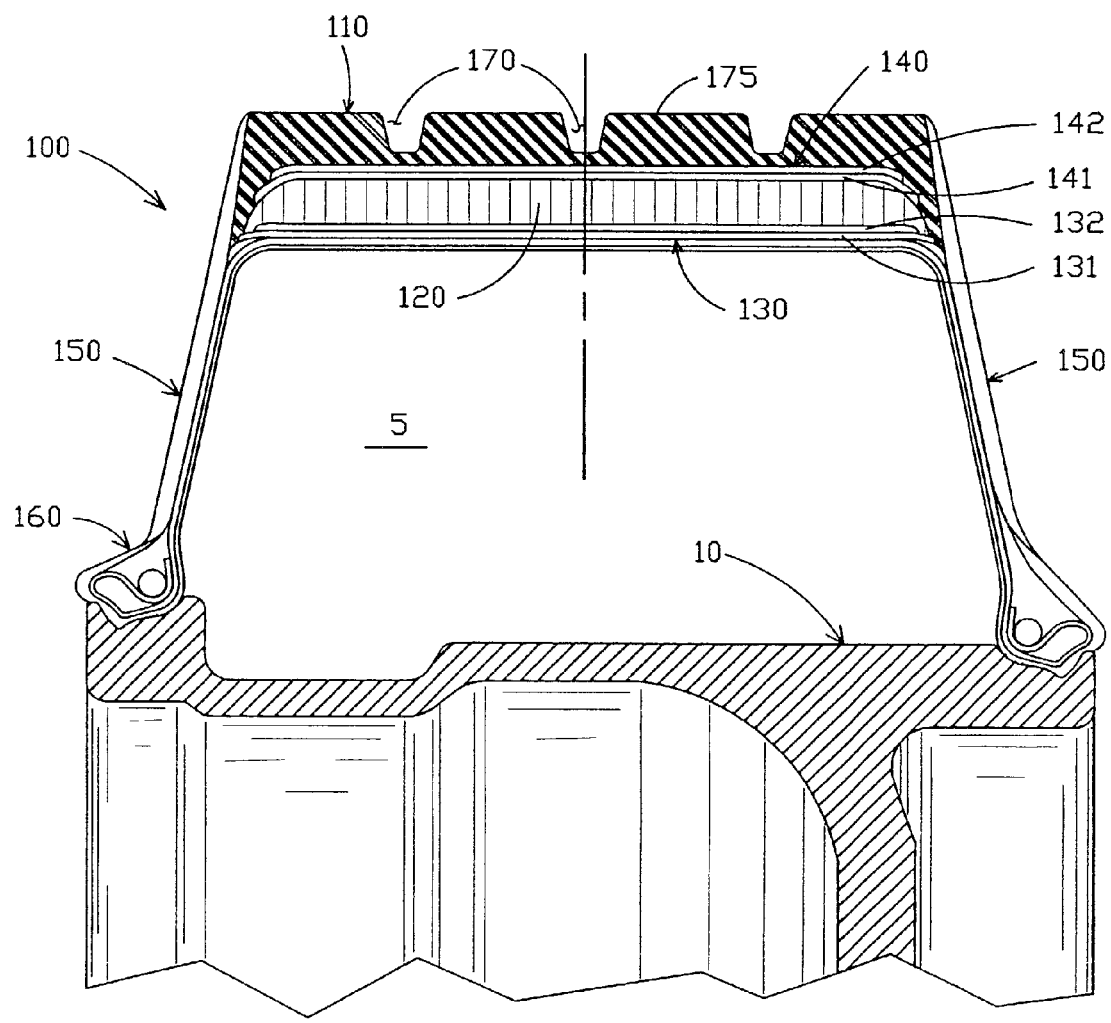
FIG. 1 is a cross section view of an illustrative embodiment of a tire of the invention.

A structurally supported resilient tire in accordance with the present invention is shown in FIG. 1. "Structurally supported" means that the tire carries a load solely through its structural components without the support of gas inflation pressure. The several embodiments of a structurally supported resilient tire described in this specification utilize similar basic components which are introduced in connection with FIG. 1. Reference numerals depicted in the drawings follow a consistent pattern for each variation and embodiment.

The tire 100 shown in FIG. 1 has a ground contacting tread portion 110, sidewall portions 150 extending radially inward from the tread portion 110, and bead portions 160 at the end of the sidewall portions. The bead portions 160 anchor the tire 100 to a wheel 10. A carcass 115 is anchored to and extends between the bead portions 160. The carcass 115 can be a radial ply carcass or a cross bias ply carcass, as will be described below. The carcass 115, tread portion 110, sidewall portions 150, and bead portions 160 form a toroidal shell that defines a hollow, annular interior space 5.

A reinforced annular band is disposed radially inward of tread portion 110. In the embodiment illustrated in FIG. 1, the annular band comprises an elastomeric shear layer 120, a first, or inner, membrane 130 having reinforced layers 131 and 132 adhered to the radially innermost extent of the elastomeric shear layer 120, and a second, or outer, membrane 140 having reinforced layers 141 and 142 adhered to the radially outermost extent of the elastomeric shear layer 120.

The tread portion 110 may have no grooves or may have a plurality of longitudinally oriented tread grooves 170 forming essentially longitudinal tread ribs 175 therebetween. Ribs 175 may be further divided transversely or longitudinally to form a tread pattern adapted to the usage requirements of the particular vehicle application. Tread grooves 170 may have any depth consistent with the intended use of the tire. The tread portion 110 has a thickness between the bottom of the tread groove and the outer membrane sufficient to protect the structure of the outer membrane from cuts and small penetrations of the tread portion. The sub-groove thickness may be increased or decreased depending on the intended use of the tire. For example, a heavy truck tire would commonly use a thickness of about 5 to 7 mm.

Each of the reinforced layers of the inner 130 and outer 140 membranes comprises essentially inextensible reinforcing elements, for example, cords, embedded in an elastomeric coating layer. For a tire constructed of elastomeric materials, membranes 130 and 140 are adhered to shear layer 120 by the vulcanization of the elastomeric materials. It is within the scope of the invention for the membranes 130 and 140 to be adhered to the shear layer 120 by any suitable method of chemical or adhesive bonding or mechanical fixation.

The reinforcing elements of the membrane layers 131–132 and 141–142 may be any of several materials suitable for use as tire belt reinforcements in conventional tires such as monofilaments or cords of steel, aramid or other high modulus textiles or reinforcing filaments. For the illustrative tires described herein, the reinforcements are steel cords of four wires of 0.28 mm diameter (4×0.28). Although the variations of the invention disclosed herein have cord-reinforced layers for each of the membranes, any suitable material may be employed for the membranes which meets the requirements described herein for tensile stiffness, bending stiffness, and compressive buckling resistance required of the annular band. The membrane structure may be any of several alternatives such as a homogeneous material, a fiber reinforced matrix, or a layer having discrete reinforcing elements.

In the inner membrane 130, layer 131 can have essentially parallel cords oriented at an angle $\alpha$ relative to the tire equatorial plane, and the layer 132 has essentially parallel cords having an orientation opposite to those in layer 131. For example, the cords may have an angle $+\alpha$ in layer 131 and an angle $-\alpha$ in layer 132. Similarly in the outer membrane 140, layers 141 and 142 can have essentially parallel cords oriented at angles $+\beta$ and $-\beta$, respectively, to the equatorial plane. In these cases, the included angle of the cords between adjacent layers will be twice the specified angle, $\alpha$ or $\beta$. Angles $\alpha$ and $\beta$ will typically be in the range of about 10° to about 45°. Preferably, the reinforcing elements are at angles $\alpha$ and $\beta$ in the range of 12° to 20°. It is not required, however, for the cords of one layer of a membrane to be oriented at a mutually equal and opposite angle to cords of the other layer of the membrane. For example, it may be desirable for the cords of the layer pairs to be asymmetric relative to the tire equatorial plane.

The cords of each of the layers 131, 132 and 141, 142 are embedded in an elastomeric coating layer typically having a shear modulus of about 20 MPa. It is preferred that the shear modulus of the coating layers be greater than the shear modulus of the shear layer 120 to insure that deformation of the annular band is primarily by shear deformation within shear layer 120.

The relationship between the shear modulus G of the elastomeric shear layer 120 and the effective longitudinal tensile modulus $E'_{membrane}$ of the membranes 130 and 140 controls the deformation of the annular band under an applied load. The effective tensile modulus $E'_{membrane}$ of the membrane using conventional tire belt materials can be estimated by the following:

$$E'_{membrane} = (2D+t)\frac{E_{RUBBER}}{2(1-v^2)}\left[\left(\frac{P}{P-D}\right)\frac{2-(1+v)\sin^2(2\alpha)}{\sin^4\alpha} + \left(\frac{t}{D}\right)\frac{1}{\tan^2\alpha}\left(\frac{1}{\tan^2\alpha}-v\right)\right] \quad (1)$$

Where. $E_{rubber}$=Tensile modulus of the elastomeric coating material;

P=Cord pace (cord centerline spacing) measured perpendicular to the cord direction;

D=Cord diameter;

v=Poisson's ratio for the elastomeric coating material;

α=Cord angle with respect to the equatorial plan; and, t=Rubber thickness between cables in adjacent layers.

Note that $E'_{membrane}$ is the elastic modulus of the membrane times the effective thickness of the membrane. When the ratio $E'_{membrane}/G$ is relatively low, deformation of the annular band under load approximates that of the homogeneous band and produces a non-uniform ground contact pressure as shown in FIG. 2A. On the other hand, when the ratio $E'_{membrane}/G$ is sufficiently high, deformation of the annular band under load is essentially by shear deformation of the shear layer with little longitudinal extension or compression of the membranes. Accordingly, ground contact pressure is substantially uniform as in the example shown in FIG. 2B.

According to the invention, the ratio of the longitudinal tensile modulus of the membrane $E'_{membrane}$ to the shear modulus G of the shear layer is at least about 100:1, and preferably at least about 1000:1. For membranes comprising cord reinforced layers using the 4×0.28 cords and the angles described above, the desired shear modulus of the shear layer 120 is about 3 MPa to about 20 MPa.

Repeated deformation of the shear layer 120 during rolling under load causes energy dissipation due to the hysteretic nature of the materials used. The overall heat buildup in the tire is a function of both this energy dissipation and the thickness of the shear layer. Thus, for a given tire design using conventional materials, the hysteresis of the shear layer should be selected so as to maintain tire operating temperatures below about 130° C. for tires in continuous use.

When the stated conditions for longitudinal tensile modulus $E'_{membrane}$ of the membranes and the shear modulus G of the shear layer are met and the annular band deforms substantially by shear in the shear layer, an advantageous relationship is created allowing one to estimate the values of shear modulus G and shear layer thickness h for a given application:

$$P_{eff} * R \approx G * h \quad (2)$$

Figure 5:
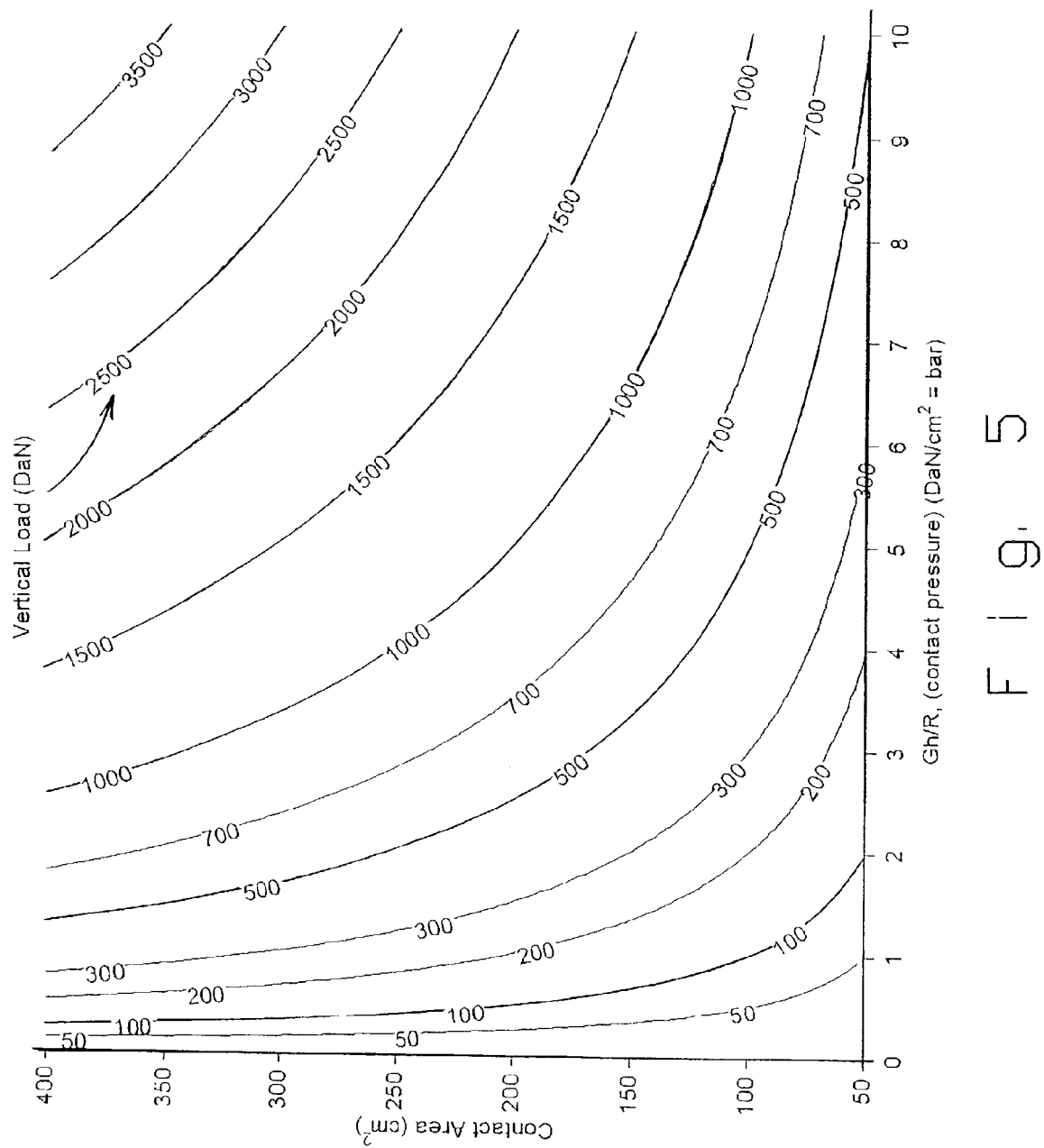
FIG. 5 illustrates graphically the relationship among contact area, contact pressure and vertical load for a tire in accordance with the invention.

Where: $P_{eff}$=Predetermined ground contact pressure;

G=Shear modulus of layer 120;

h=Thickness of layer 120; and,

R=Radial position of the outer membrane;

$P_{eff}$ and R are design parameters chosen according to the intended use of the tire. Equation (2) suggests that the product of the shear modulus of elasticity of the shear layer times a radial thickness of the shear layer is approximately equal to a product of a predetermined ground contact pressure times a radial position of the outermost extent of the outer membrane. FIG. 5 graphically illustrates this relationship over a broad range of contact pressures and can be used to estimate the shear layer characteristics needed for many different applications.

The above relation is advantageous to one designing a tire in accordance with the invention. For example, to design a tire intended for passenger car use, the designer may select a design contact pressure $P_{eff}$ of 1.5 to 2.5 DaN/cm² and a tire size in which the radius R is about 335 mm. By multiplying these values, a "shear layer factor" of 50.25 to 83.75 DaN/cm may be determined, which can be used to specify the shear layer material thickness h and shear modulus G. In this case, using a shear modulus in the range of about 3 MPa to about 10 MPa, the thickness h of the shear layer is at least 5 mm and preferably is between about 10 mm to about 20 mm.

Figure 3A:
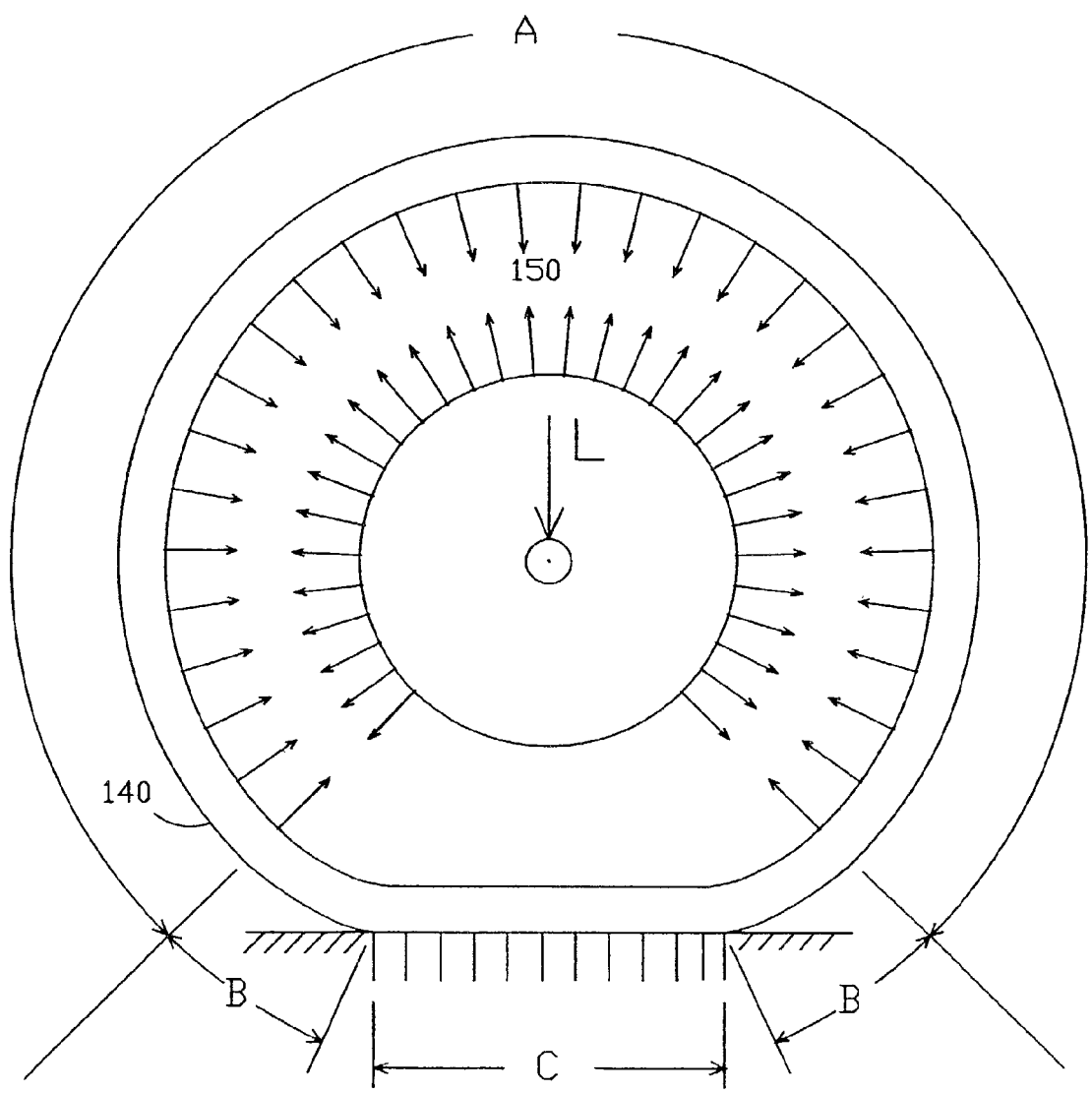
FIG. 3A illustrates schematically the load carrying mechanism in the equatorial plane for the tire of the invention.
Figure 3B:
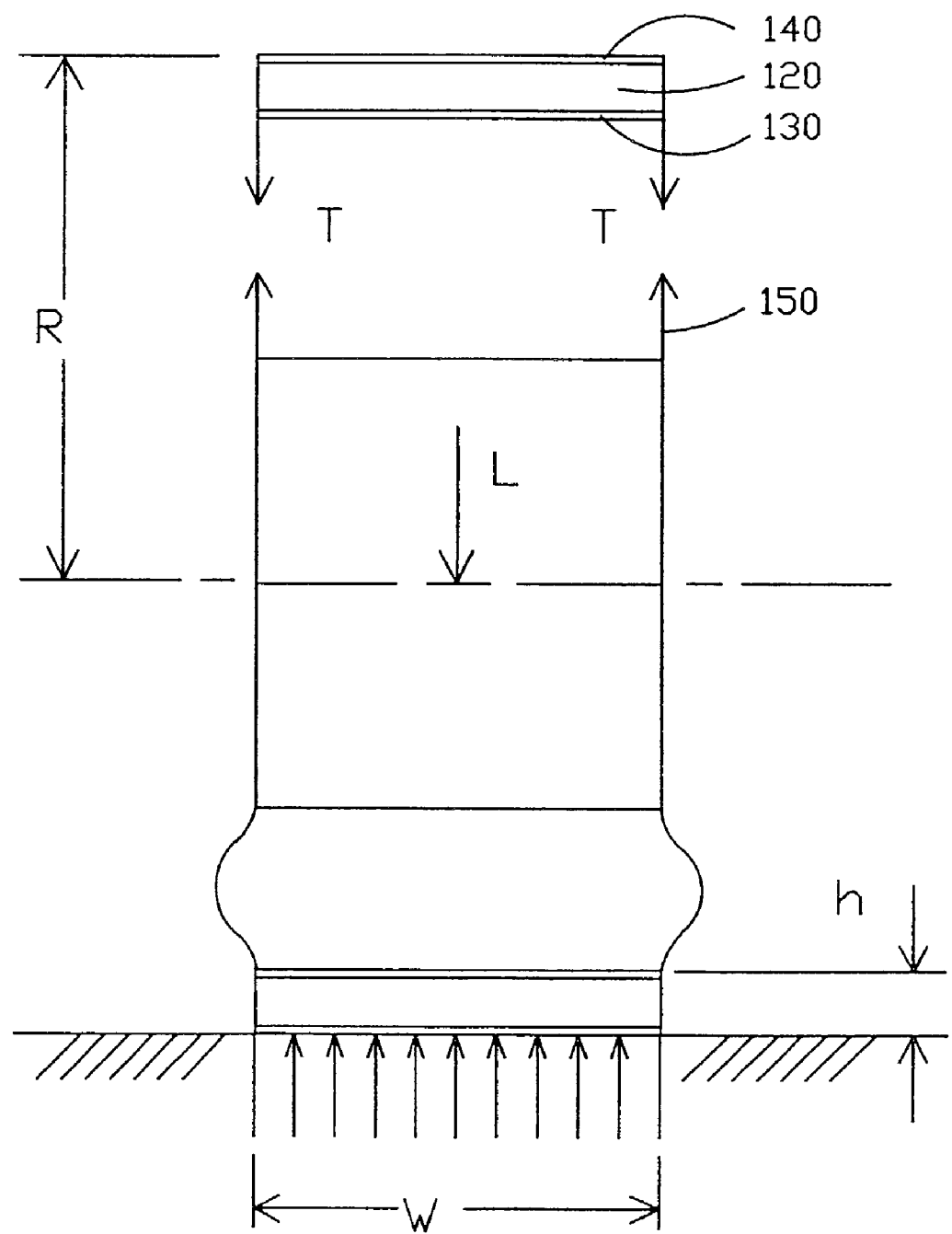
FIG. 3B illustrates schematically the load carrying mechanism in the meridian plane for the tire of the invention.

Referring to FIGS. 3A and 3B, the tire of the invention substantially supports an applied load L by transmitting the load from the wheel to the annular band through tension in the region A of the sidewall portion 150 out of contact with the ground. By contrast, in a pneumatic tire, the toad is carried by differences in tension in the pressurized sidewall induced by ground contacting deformation of the tire.

In the tire according to the invention, the sidewall tensile forces are carried by the carcass 115, which is reinforced by essentially inextensible cords. According to one embodiment of the invention, the carcass includes one or more layers of radially oriented reinforcing cords. Alternatively, the carcass may include at least two layers having reinforcing cords oriented in a cross bias pattern. As will be understood by those skilled in the art, both the radial carcass and cross bias carcass experience tension in the sidewall portion out of ground contact. The arrows in FIG. 3A are meant to indicate the existence of tension in the sidewall, rather than the actual direction of the cord tensile forces.

According to a radial carcass embodiment, the sidewall portions are essentially inextensible in tension and with low resistance to compressive buckling. Under this condition, the sidewall portion 150 of the tire has an effective radial stiffness in tension sufficiently greater than an effective radial stiffness in compression to support an externally applied load substantially by tensile forces in the sidewall portion of the tire out of contact with the ground and substantially without vertical load support due to the sidewall portion of the tire in contact with the ground. The wheel can be said to hang from the upper portion of the tire.

Effective radial stiffness of the sidewall portion means the tensile or compressive property associated with the entire radial extent of the sidewall. This could be measured, for example, by removing a sample from the sidewall that maintains the unstressed geometry of the sidewall, and thereafter testing it in a standard tensile testing apparatus. A curved sidewall as is found in a pneumatic tire would have a tensile stiffness related to the curvature of the sidewall, and would accordingly, be lower than the tensile stiffness of a sidewall of the tire of the invention, which is essentially straight.

The above-defined sidewall compressive stiffness requirements can be met where the sidewall portion has an axial thickness less than 20% of the radial section height of the tire.

In a cross bias carcass embodiment of the invention, the sidewall is stiffer than a radial carcass tire. While the majority of the load is supported by tension in the non-contacting region A, the cross bias carcass provides additional resistance to deflection of the tire in the portion of the tire deformed by ground contact, in FIG. 3A, the regions B and C. The cross bias carcass has additional stiffness in shear in the circumferential direction, and in bending in the lateral direction.

Returning to FIG. 1, preferably, the sidewall portion 150 extends rectilinearly between the tread portion 110 and the bead portions 160 as viewed in the tire meridian plane, that is, the sidewall portion 150 is not curved as in a conventional pneumatic tire. The sidewall portions can slope from the tread to the rim, widening as shown in FIG. 1, or narrowing.

The geometry of the rectilinear sidewall portions 150 and the force/elongation characteristics of the reinforcing cords are such that tensile forces in the sidewall portion produce minimal elongation or change in shape of the sidewall portion, analogous to increasing the tension in a taut string. By comparison, when the curved sidewall of a conventional pneumatic tire is placed under tension in an un-inflated state, the tensile force initially straightens the curve and thus effectively elongates the sidewall. Only after the curved sidewall is straightened does tension increase in the sidewall.

The tensions developed in the sidewalls of the tire of the invention when loaded are significantly lower than the sidewall tensions of an inflated and loaded pneumatic tire. Referring to FIG. 1, the bead portions 160 may employ any of several bead structures which allow proper seating on the rim 10 without relying on inflation pressure and which maintain proper seating of the bead portions during use of the tire. An example of a bead construction meeting these requirements is shown in U.S. Pat. No. 5,785,781 to Drieux et al and is incorporated by reference herein.

Vertical stiffness relates to the ability of the tire to resist deflection when under load. Vertical stiffness can be adjusted to optimize the load carrying capability of a given tire. Alternatively, vertical stiffness can be adjusted to provide an annular band of reduced thickness for reduced contact pressure or tire mass while maintaining a desired level of vertical stiffness.

Figure 4B:
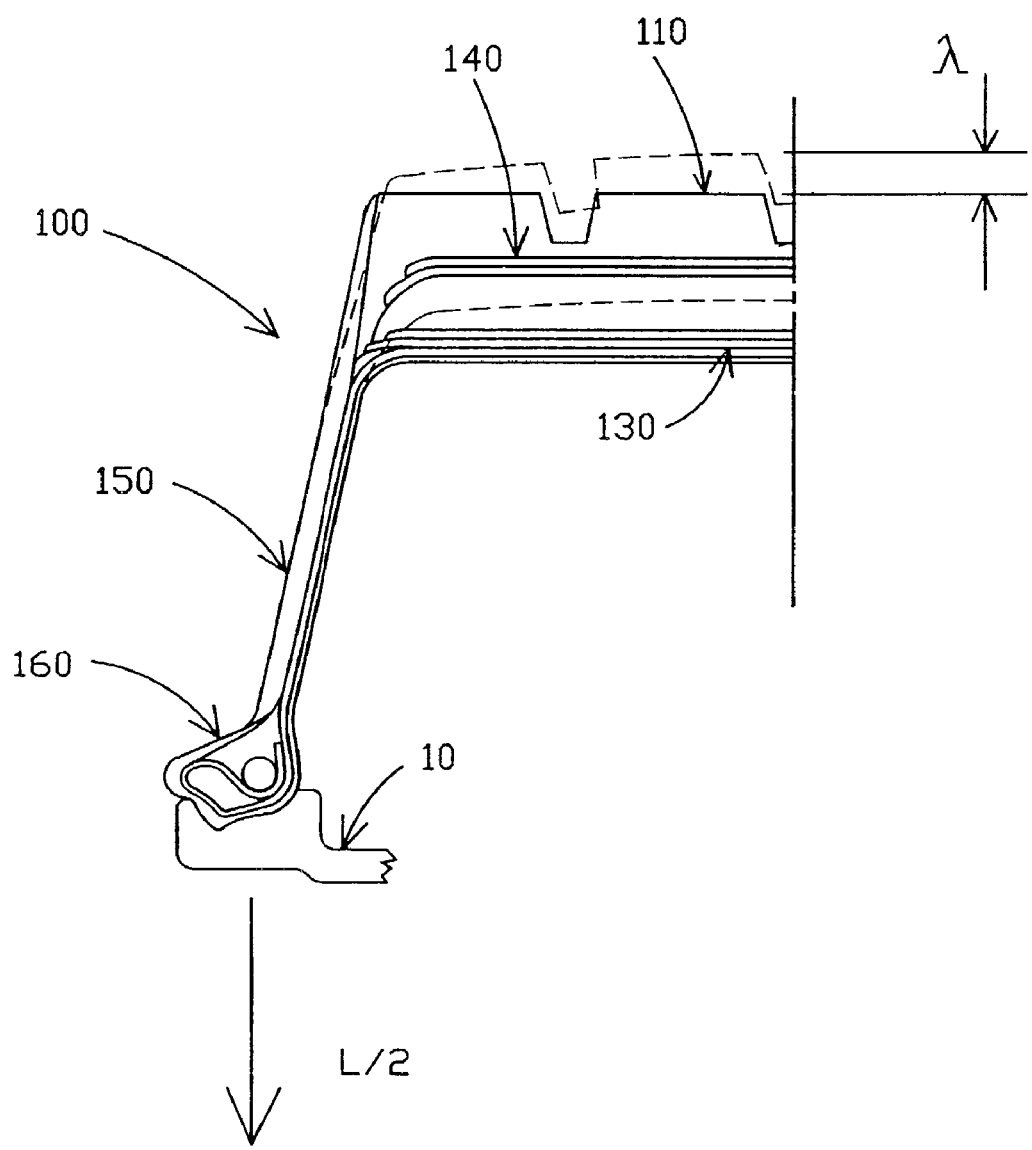
FIG. 4B illustrates counterdeflection stiffness in the tire meridian plane.

Vertical stiffness of the tire is strongly influenced by the reaction of the portion of the tire not in contact with the ground to the deflection of the portion in contact with the ground, the "counterdeflection" of the tire. FIGS. 4A and 4B illustrate this phenomenon in exaggerated scale. When the tire is under a load L, it deflects an amount f, allowing the tire to form a ground contact area C. Note that for the purposes of this description the frame of reference in FIGS. 4A and 4B maintains the tire axis X at a fixed location and moves the ground upward toward the axis. The vertical deflection f is proportional to the load L, from which the vertical stiffness $K_v$ of the tire may be derived. Because the annular band seeks to maintain a constant length, a portion of the tire not in ground contact shifts, or counterdeflects, away from the contact area C, as indicated by the broken lines in the figures. The counterdeflection amount $\lambda$ is also proportional to the load L, and the counterdeflection stiffness $K_\lambda$ may thus be obtained. Counterdeflection stiffness $K_\lambda$ relates to the way that the tire reinforcing cords not in ground contact are loaded, and should be understood as involving both transverse and circumferential structural interactions.

Counterdeflection can be measured directly by placing a tire under a toad F with the axis fixed and measuring both deflection f of the tire in the contact area and the deflection of the tread surface opposite the contact area. Counterdeflection stiffness is then determined by dividing the load F by the counterdeflection amount $\lambda$.

In practice, counterdeflection stiffness $K_\lambda$ substantially controls the vertical stiffness of the tire, and accordingly, the deflection under load of the wheel axis of a tire. Counterdeflection stiffness $K_\lambda$ determines the length of the contact area, as may be seen in FIG. 4A. Low counterdeflection stiffness allows the annular band to move vertically under load, and thus reduces the load capacity at that deflection. Accordingly, a tire having high counterdeflection stiffness has relatively less counterdeflection and a longer contact area, and as a result, can carry a larger load.

Figure 6:
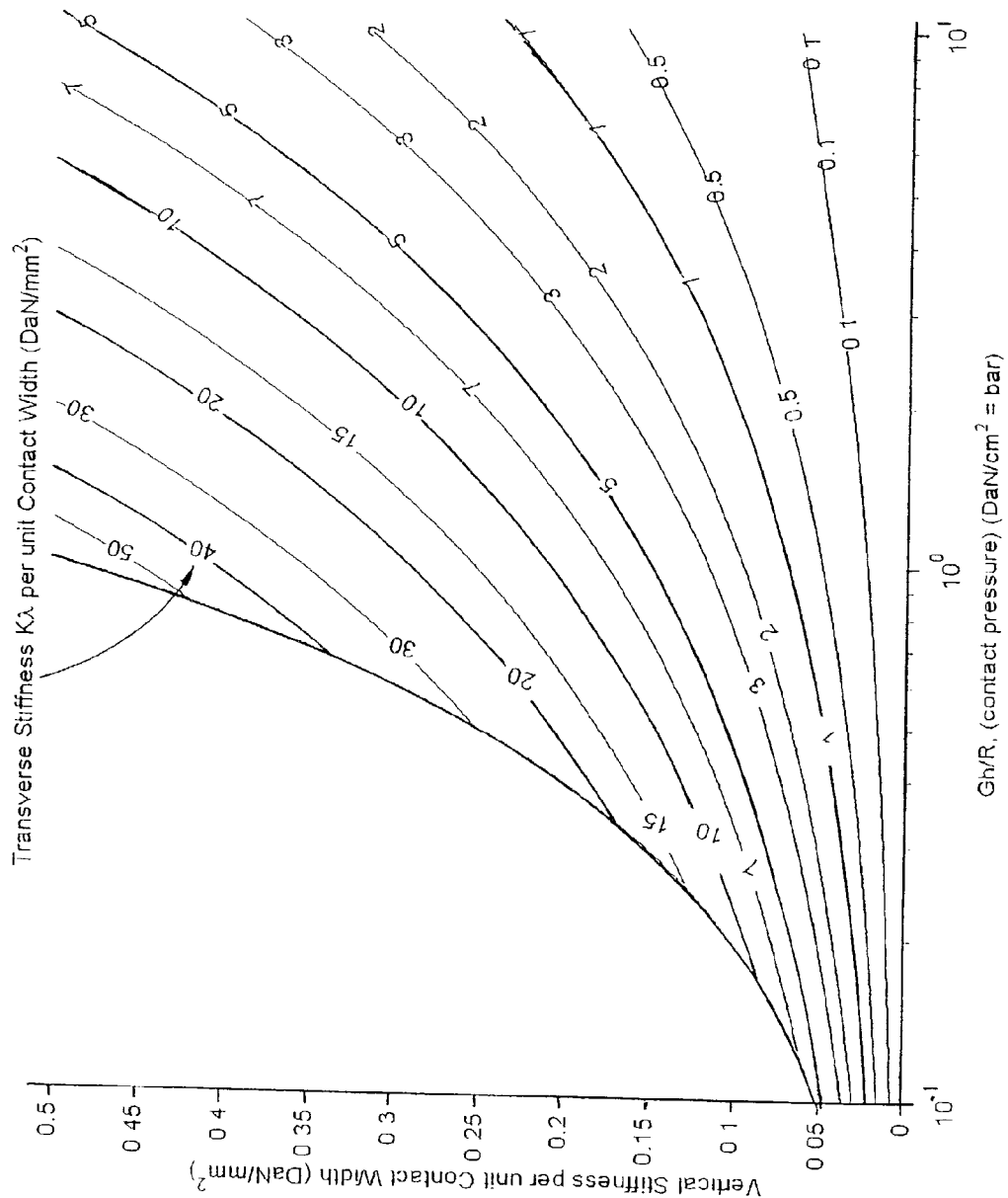
FIG. 6 illustrates graphically the relationship among contact pressure, vertical stiffness, and counterdeflection stiffness for a tire in accordance with the invention.

FIG. 6 shows graphically an approximated relationship of counterdeflection stiffness $K_\lambda$ to the vertical stiffness of the tire having a radial carcass. FIG. 6 demonstrates the independence of vertical stiffness and contact pressure available with this invention, which allows design flexibility not available in pneumatic tires. A deflated pneumatic tire has typically a counterdeflection stiffness per unit contact area width of less than 0.1 DaN/mm². A tire in accordance with the invention, by contrast, can be designed to have a counterdeflection stiffness per unit contact area width ranging above 0.1 DaN/mm².

Counterdeflection stiffness $K_\lambda$ can be modified in a number of ways. Some of the design parameters used to adjust this stiffness include the carcass cord modulus and density, the sidewall height, the modulus of the elastomeric coating of the carcass cords, the geometry of the coupling between the carcass and the annular band, the modulus of the coupling rubber, the compressive modulus of the annular band membranes, the thickness of the shear layer, the tire diameter, and the width of the annular band.

As mentioned, the inventors have discovered that a cross bias carcass can increase the vertical stiffness of the tire by changing the stiffness of the sidewalls and changing the coupling between the annular band and the sidewalls. Referring again to FIG. 3A, cross bias reinforcing cords will generate forces resisting deflection in the contact area C because the cross bias structure resists lateral deformation (the typical radial carcass bulge). In addition, cross bias cords produce radial and circumferential tensile force components at the regions B going into and coming out of the contact area C. The sidewalls resist torsion at the ends of the contact area C, making the tire stiffer and decreasing the amount of deflection. An appropriate amount of stiffness in the cross bias carcass can be modified by the selection of the cord material and diameter, and the cord layout, using known analytical tools and some experimentation.

Figure 7:
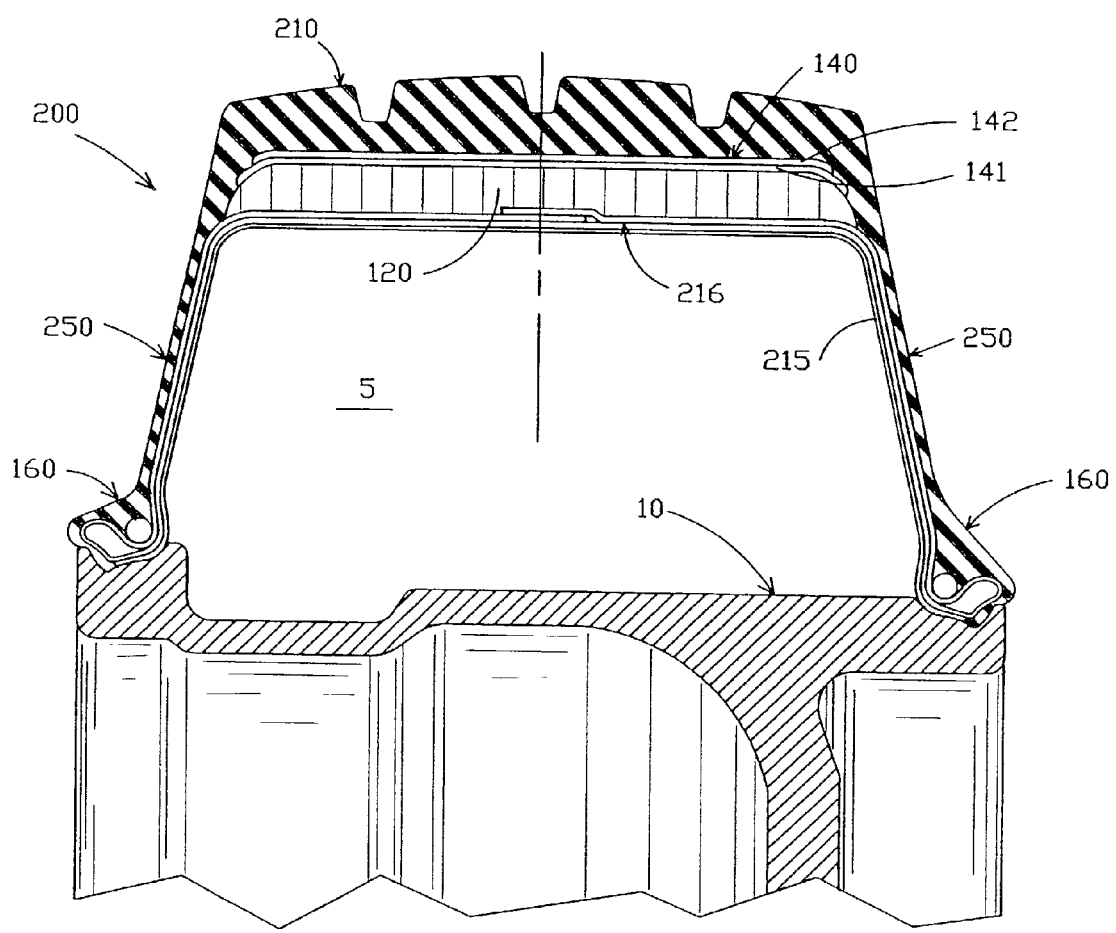
FIG. 7 is a cross section view of a cross bias carcass embodiment of a tire of the invention.

Referring now to FIG. 7, a cross bias carcass provides advantages in designing a tire intended for lighter loads. In a tire 200 having a cross bias carcass 215, the carcass is arranged between the bead portions 160 to overlap under the shear layer 120 to provide two layers. The summit portion 216 of the carcass 215, that is, the portion under the shear layer 120, serves as an inner membrane. Preferably, the cords in the summit portion 216 are arranged at an angle of 12° to 15° relative to the equatorial plane to obtain sufficient circumferential stiffness relative to the shear layer. Note from the discussion of the membranes 130, 140 in connection with FIG. 1 that the membrane reinforcing elements are directed at angles within this same range. Thus, using a cross bias carcass, the inner membrane and, accordingly, the weight of a membrane and a manufacturing step can be eliminated. In addition, this structure is believed also to improve the transmission of forces between the shear layer and sidewalls, as it eliminates the need to couple the inner membrane and carcass. This improved coupling of shear layer to sidewall can also have an effect on the vertical stiffness.

The cords in the sidewall region 250 are arranged at an angle of 30° to 60°, and more preferably 45°, relative to the circumferential direction at the midpoint between the bead area 160 and the summit 216. Those skilled in the art will understand how to arrange a carcass on a forming drum to obtain these cord angles in the summit and sidewalls after the carcass assumes its toroidal shape using the known relationship $\cos \phi / r = c$, where $\phi$ is the angle of the cords to the circumferential direction, r is the radius from the axis of rotation of the tire and c is a constant.

If the cross bias carcass 215 is made using similar materials as the outer membrane layers 141, 142 described above, the longitudinal stiffness of the summit portion 216 can approximate that of the outer membrane. For lighter loads, for example, for smaller vehicles such as golf carts, mopeds, etc., a cross bias carcass using conventional tire materials, nylon cords or the like, is suitable. For such a construction, the longitudinal stiffness of the carcass in the shear layer region will be less than that of the outer membrane, however, a longitudinal stiffness at least 100 times the shear modulus of the shear layer is generally sufficient for lower load ranges.

The vertical stiffness of the tire of the invention is also influenced by the effect of centripetal forces on the annular band and sidewall portions. As the speed of a rolling tire increases, centripetal forces develop. In conventional radial tires, centripetal forces can increase tire operating temperature. The tire of the invention, in contrast, obtains an unexpected beneficial result from these same forces. When the tire of the invention rotates under an applied load, centripetal forces cause the annular band to tend to expand circumferentially and induce an additional tension in the sidewall portions. The radially stiff sidewalls for the portion of the tire out of contact (region A of FIG. 3A) resist these centripetal forces. This produces a net upward resultant force which acts to increase the effective vertical stiffness of tire and to reduce radial deflection of the tire relative to the static, non-rotating condition. This result is obtained to a significant degree when the ratio of the longitudinal stiffness of the band in the tire equatorial plane ($2 \cdot E'_{membrane}$) to the effective stiffness of the sidewall portion in tension is less than 100:1.

The tire shown in FIG. 1 has a flat transverse profile for the tread portion 110, inner membrane 130 and outer membrane 140. The strains in the portion of the annular band in the contact region C will be compressive for the outer membrane 140, which may be understood by reference to FIG. 3A. As the vertical deflection of the tire increases, the contact length C can increase such that the compressive stress in outer membrane 140 exceeds the critical buckling stress, and a longitudinal buckling of the membrane occurs. This buckling phenomenon causes a longitudinally extending section of the contact region to have reduced contact pressure. A more uniform ground contact pressure throughout the length of the ground contacting region is obtained when buckling of the membrane is avoided. A membrane having a curved transverse section will better resist buckling in the contact area.

Figure 8:
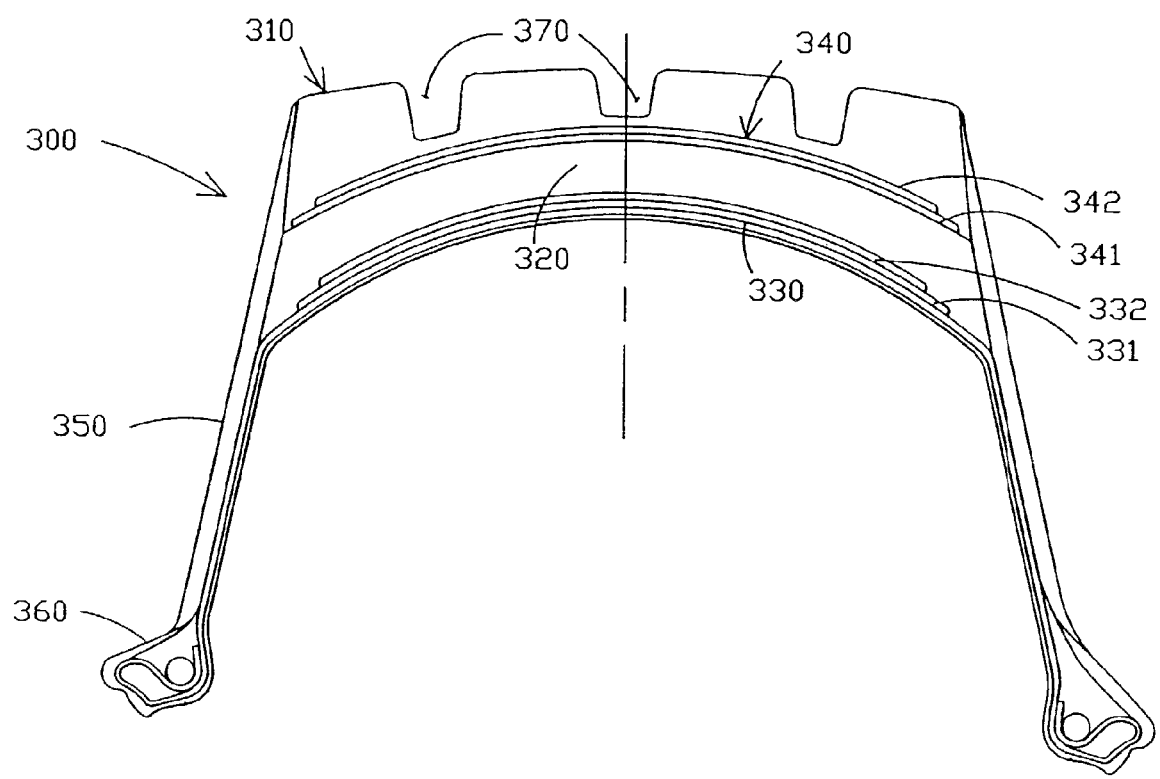
FIG. 8 is a cross section view of a tire according to the invention having arcuate membranes.

In a variation of the invention shown in FIG. 8, tire 300 has an annular band including shear layer 320, inner membrane 330, and outer membrane 340 having a transverse radius that is less than the transverse radius of the radially outermost surface of the tread portion 310. The curvatures shown in FIG. 8 are exaggerated for the purposes of illustration. Optimization of the contact pressure between the tread surface and the ground for a passenger vehicle tire suggests that the transverse radius of outer membrane 340 be at least 500 mm and the transverse radius of the radially outermost surface of the tread portion 310 be at least 1000 mm. A curved outer membrane may also be used in the bias carcass tire 200 of FIG. 7.

Tires designed for passenger car use conforming to the specifications of the tire 300 illustrated in FIG. 8 were reduced to practice using conventional tire building processes and materials. A summary of the results is shown in Table 1.

TABLE 1

| | Example Tire |
|---|---|
| Tire Size | 235 mm section width<br>690 mm outside diameter<br>460 mm seat diameter |

TABLE 1-continued

| | Example Tire | |
|---|---|---|
| Design Parameters | | R = 335 mm<br>G = 3 N/mm$^2$<br>h = 18 mm<br>E' membrane = 8750 N/mm<br>P effective = Gh/R = 1.6 bar<br>$K_\lambda$ = 180 DaN/mm |
| Vertical Stiffness | 17.2 | DaN/mm @ 20 mm deflection<br>(secant stiffness) |
| Cornenng Coeff. | 0.26 | @ 1 deg. steer |
| Max Temperature | 112 | deg. C. @ 392 DaN load, 80 kph |
| High Speed Limit | 270 | kph @ 294 DaN load |
| Durability | 40000 | km @ 294 DaN load, 50 kph,<br>No Damage |
| Deflection Reduction | 19 | % @ 392 DaN load from 40 to<br>120 kph |

Subjective evaluation on a 10 point scale (higher = better)
comparison with pneumatic tire of the same size

| | Pneumatic 1 | Pneumatic 2 | Invention |
|---|---|---|---|
| Pressure (front/rear) | 1.9/1.8 bar | 1.2/1.2 bar | 0 bar |
| Handling | 6.75 | 6 | 6 |
| Comfort | 5 | 6.25 | 6 |
| Noise | 6 | 6.5 | 6.5 |

In the subjective evaluation, test pneumatic tire 1 was inflated to the recommended cold tire pressure and test pneumatic tire 2 was inflated to a pressure to achieve a vertical stiffness equivalent to the tire made in accordance with the invention.

Tires conforming to the specifications of tire 300 tend to have average values of longitudinal ground contact stresses that are positive, or driving, along the longitudinal centerline of the contact zone and negative, or braking, along the lateral edges of the contact zone. This difference is due to the difference in rolling radius between the centerline and lateral edges of the annular band. A preferred result for tire performance (particularly wear) is obtained when the longitudinal stresses are well equilibrated between the centerline and lateral edges.

Figure 9:
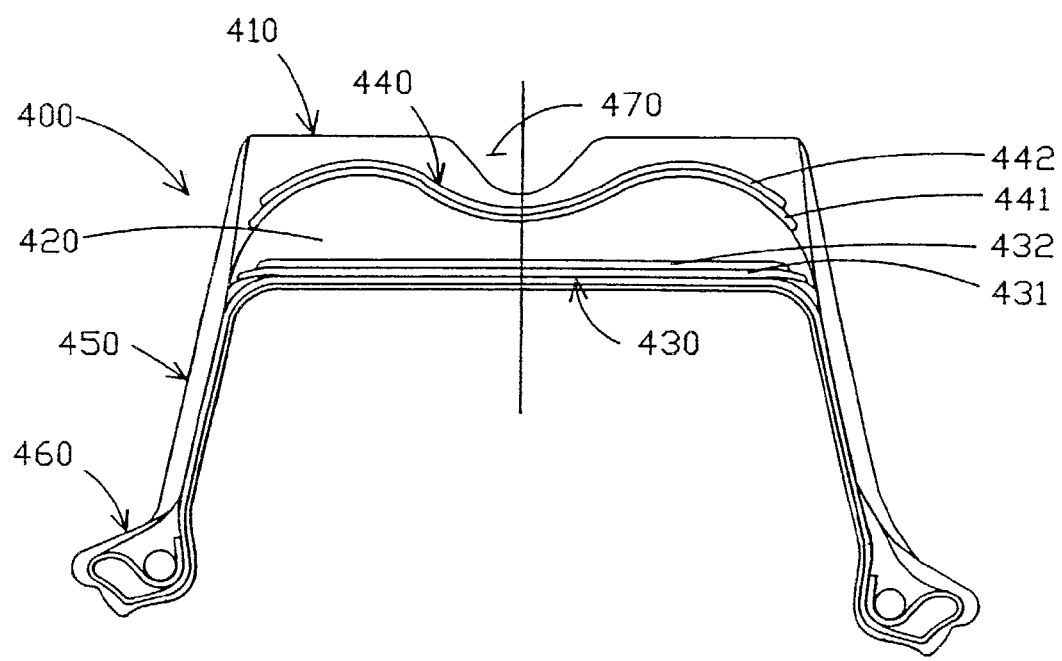
FIG. 9 is a cross section view of a tire in accordance with the invention having an undulated second membrane.

An alternative embodiment of the invention is shown in FIG. 9 wherein tire 400 has an undulated outer membrane having an amplitude of undulation in the radial direction and a wavelength of undulation in the axial direction. The amplitude of undulation is defined as the difference between the maximum and minimum radial extents of the membrane. The wavelength of undulation is defined as the axial distance between successive radial maxima of the membrane. The undulated outer membrane resists buckling due to compression in the contact zone like the arcuate membrane of tire 300 of FIG. 8. Deforming the outer membrane from essentially a circular shape to a flat shape by an externally applied load occurs without longitudinal buckling of said outer membrane and maintains an essentially uniform ground contact pressure of said ground contacting tread portion throughout the length of the ground contacting region. The effectiveness of the undulated membrane to resist buckling is independent of its overall transverse curvature. Thus, it is possible for tire 400 to have an outer membrane 440 whose transverse radius of curvature may be specified to optimize ground contact stresses independent of its resistance to buckling. Preferably, outer membrane 440 has two to five cycles of undulation, and has a wavelength of undulation of about 20% to about 50% of the rolling tread width of the tread portion 410. The amplitude of undulation is preferably between about 20% and 50% of the maximum shear layer thickness and may be a constant or variable amplitude. Shear layer 420 has an average thickness equal to the constant thickness shear layer specified by Equation (2) for shear layer 120 of tire 100 and shear layer 320 of tire 300.

Figure 10:
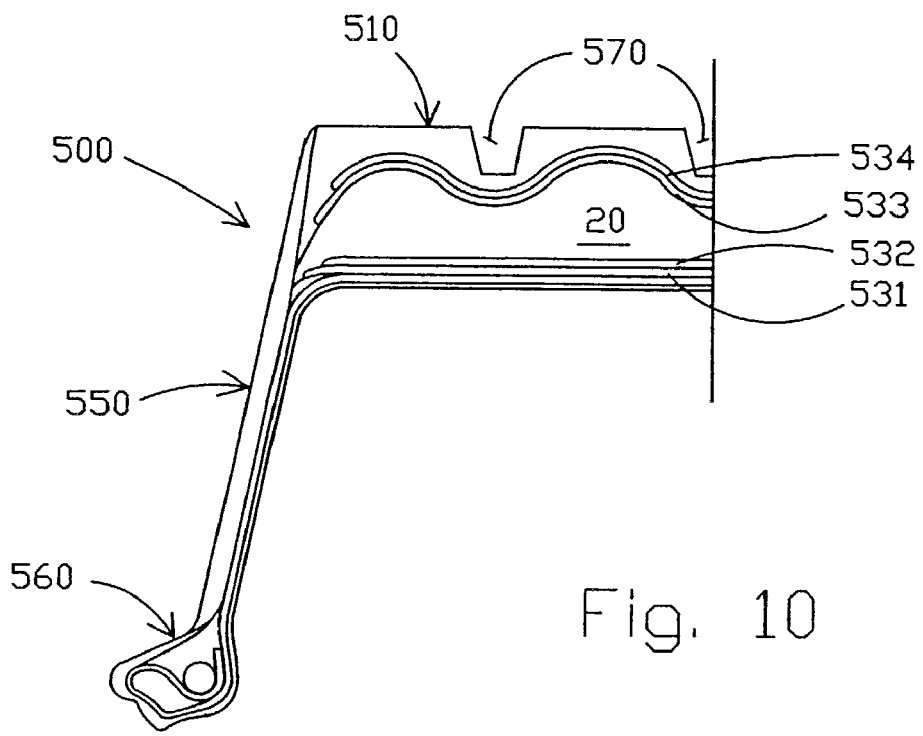
FIG. 10 is a cross section view of a tire of the invention corresponding to a variation of the embodiment shown in FIG. 9; and, FIG. 11 is a cross section view of a tire of the invention corresponding to another variation of the embodiment shown in FIG. 9.
Figure 11:
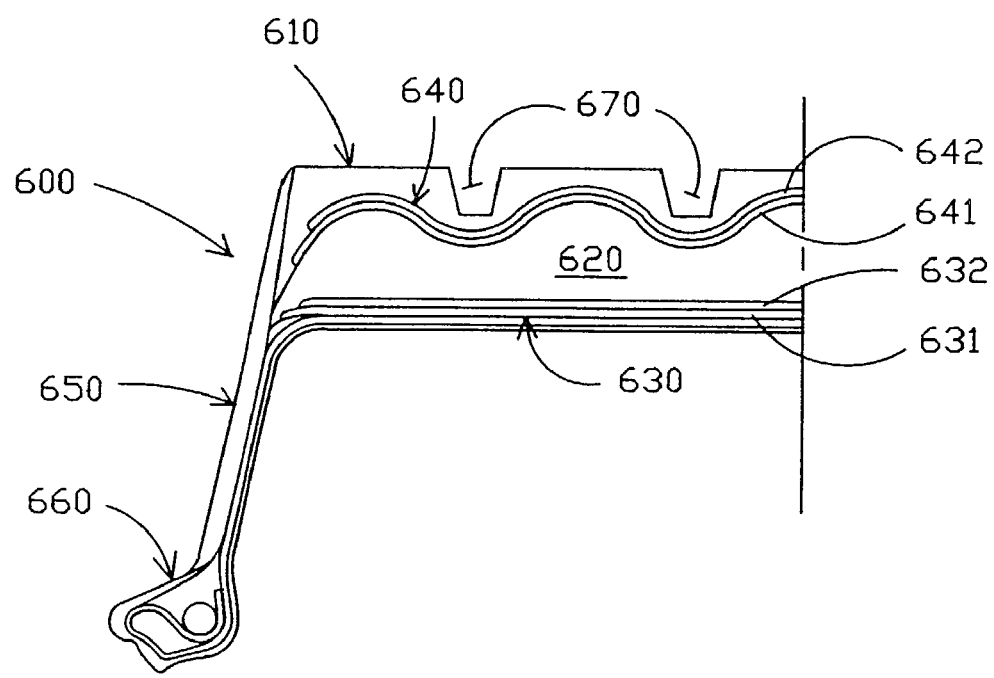

Further variations of an undulated outer membrane are shown in FIGS. 10 and 11, wherein the undulated outer membrane has respectively four or five crests. In these variations the crests are laterally disposed within each tread rib with a concave portion underlying each tread groove. The number of crests need not be a function of the number of tread ribs nor must the tire have longitudinal ribs. The invention may be equally applied to a slick tire or other rubber article having no grooves. When tire 400 has at least one tread groove 470 disposed radially outward of a minimum, or concave portion, of the undulation, the groove can have an increased depth relative to the nominal tread depth of a conventional tire. In this case nominal means a standard tread depth for a particular class of tire as defined by the Tire and Rim Association of Copley, Ohio. In the variations illustrated by tires 400, 500, and 600, the at least one tread groove has a depth of at least 120% of a nominal tread depth.

Applicants understand that many other variations are apparent to one of ordinary skill in the art from a reading of the above specification. These variations and other variations are within the spirit and scope of the instant invention as defined by the following appended claims.

What is claimed is:

1. A structurally supported resilient tire, comprising a ground contacting tread portion and sidewall portions extending radially inward from said tread portion and anchored in bead portions for securing the tire to a wheel, the tire further comprising:
   a carcass ply having at least two layers extending between the bead portions and including parallel reinforcing cords oriented relative to the tire equatorial plane at an angle greater than about 10° and less than about 45°, the cords of said at least two layers being mutually oblique;
   an elastomeric shear layer disposed radially outward of said reinforced ply; and
   a membrane adhered to the radially outward extent of said elastomeric shear layer, wherein said membrane and a portion of said carcass ply disposed radially inward of said shear layer each have a longitudinal tensile modulus greater than the shear modulus of said shear layer.

2. The tire as claimed in claim 1, wherein the reinforcing cords of the carcass ply are disposed at an angle in a range of about 15° to about 20° to the tire equatorial plane in a tire summit.

3. The tire as claimed in claim 1, wherein the reinforcing cords of the carcass ply are disposed at an angle in a range of about 30° to about 60° to the equatorial plane in the sidewall portions.

4. The tire as claimed in claim 1, wherein said carcass ply comprises two sheets of reinforcing cords.

5. The tire as claimed in claim 1, wherein said carcass ply is a single sheet of reinforcing cords disposed to wrap around the beads and with its free ends overlapping at the equatorial plane.

6. The tire as claimed in claim 1, wherein the shear layer is adhered directly to the carcass ply.

7. The tire as claimed in claim 1, wherein a ratio of the longitudinal tensile modulus of said portion of the reinforced carcass ply radially inward of the shear layer to the shear modulus of said shear layer is at least about 100:1.

8. The tire as claimed in claim 1, wherein a ratio of the longitudinal tensile modulus of said membrane to the shear modulus of said shear layer is at least about 100:1.

9. The tire as claimed in claim 8, wherein the ratio of the longitudinal tensile modulus of said membrane to the shear modulus of said shear layer is at least about 1000:1.

10. The tire as claimed in claim 1, wherein said membrane comprises layers of essentially inextensible cord reinforcements embedded in an elastomeric coating layer having a shear modulus of elasticity at least equal to the shear modulus of elasticity of said shear layer.

11. The tire as claimed in claim 10, wherein the cord reinforcements of said membrane form an angle with the tire circumferential direction of between about 10° and 45°.

12. The tire as claimed in claim 1, further comprising a second membrane disposed between the shear layer and the carcass ply and adhered to the shear layer, the second membrane having a longitudinal tensile modulus greater than the shear modulus of said shear layer.

13. The tire as claimed in claim 12, wherein said second membrane comprises layers of essentially inextensible cord reinforcements embedded in an elastomeric coating layer having a shear modulus of elasticity at least equal to the shear modulus of elasticity of said shear layer.

14. The tire as claimed in claim 13, wherein the cord reinforcements of said second membrane form an angle with the tire circumferential direction of between about 10° and 45°.

15. The tire as claimed in claim 1, wherein the tire has a counterdeflection stiffness per unit contact area width greater than 0.1 DaN/mm$^2$.

16. The tire as claimed in claim 1, wherein $G \cdot h \approx P \cdot R$, wherein G is the shear modulus of elasticity of said shear layer, h is the radial thickness of said shear layer, P is a predetermined ground contact pressure for the tire and R is the radial position of the outermost extent of said membrane.

17. The tire as claimed in claim 1, where said sidewall portions are rectilinear in the tire meridian plane.

18. The tire as claimed in claim 17, wherein said sidewall portion has a maximum thickness 20% of the radial section height of said tire.

19. The tire as claimed in claim 17, wherein said sidewall portion has a maximum thickness 10% of the radial section height of said tire.

* * * * *